Jan. 15, 1957 B. M. BENSIN 2,777,253
SYSTEM FOR IMPROVING GROWING CONDITIONS FOR PLANTS AND
FARM ANIMALS IN UNFAVORABLE CLIMATES BY SOLAR ENERGY
Filed April 30, 1952 4 Sheets-Sheet 1
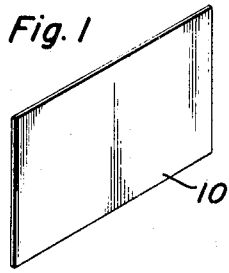
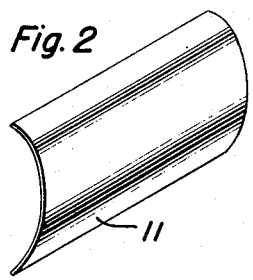
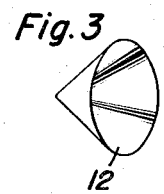
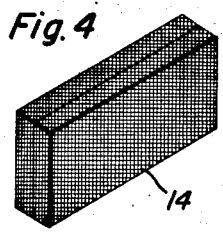
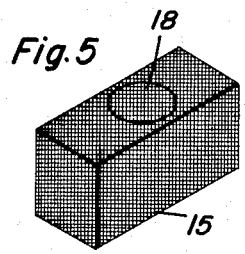
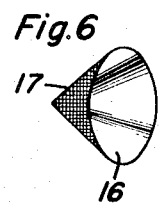
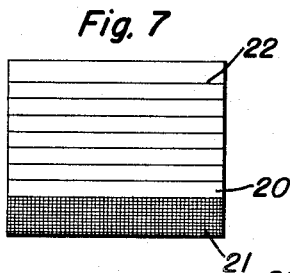
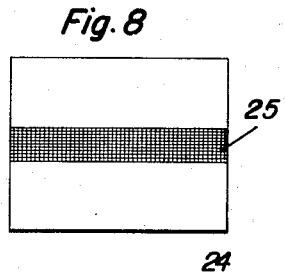
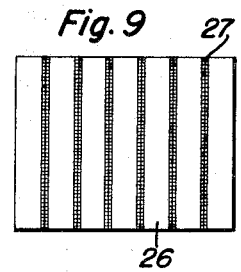
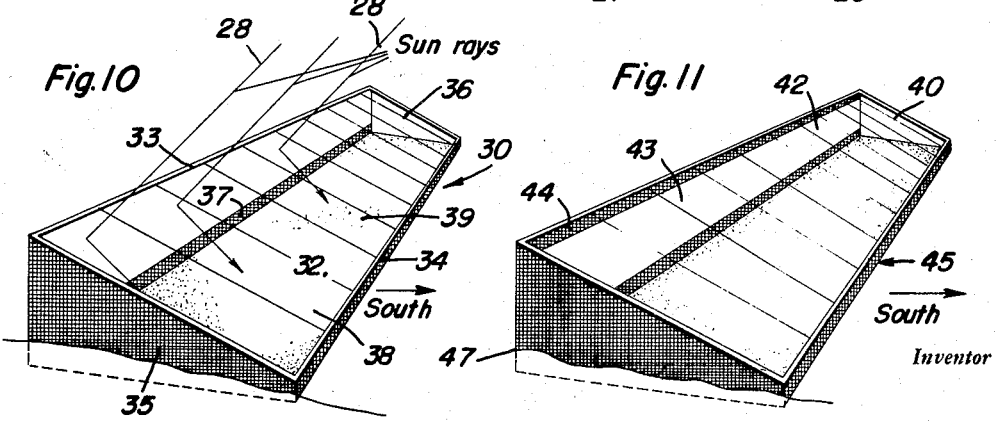
Inventor
Basil M. Bensin
By *Clarence A. O'Brien and Harvey B. Jacobson*
Attorneys

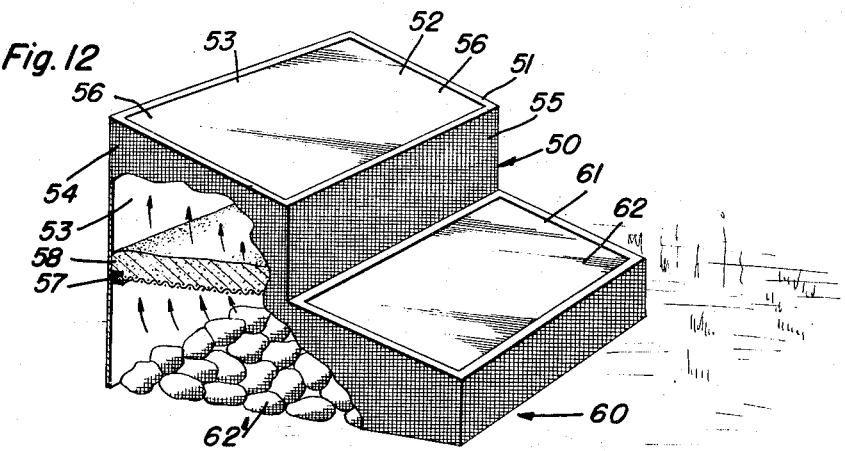
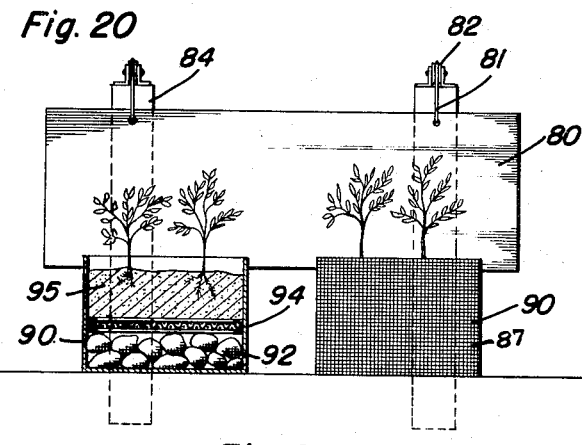
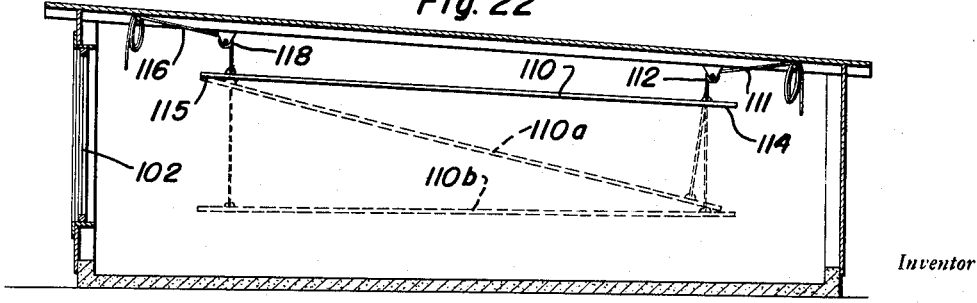

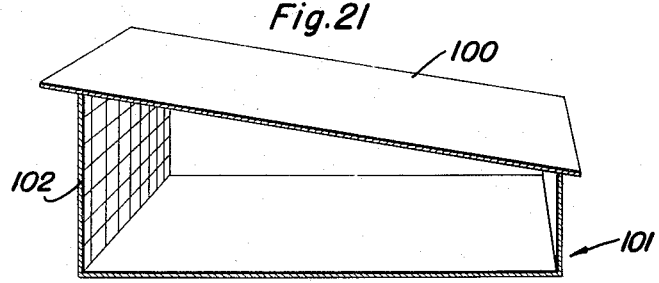
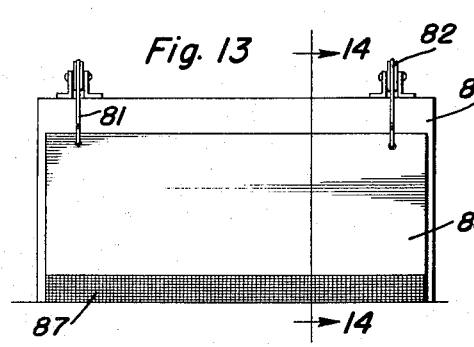
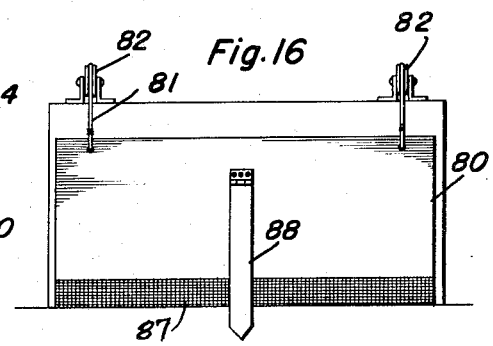
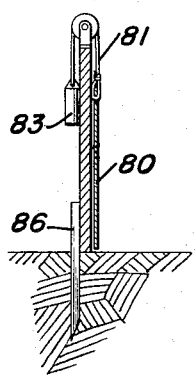
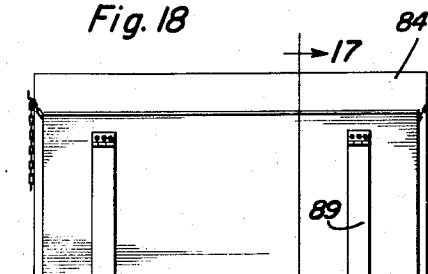
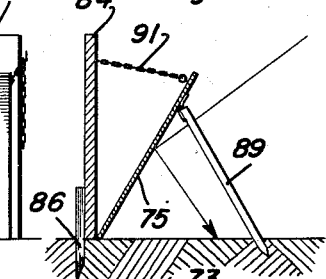
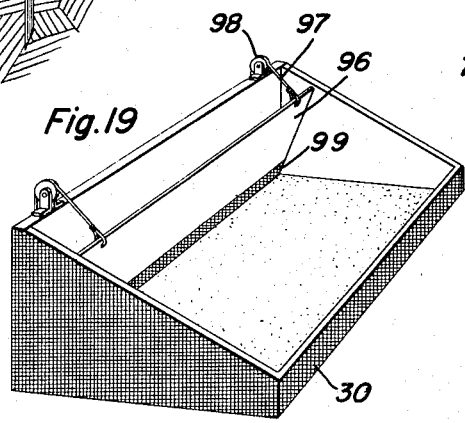
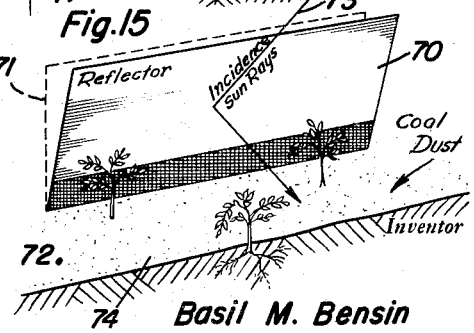
Basil M. Bensin Jan. 15, 1957  B. M. BENSIN  2,777,253
SYSTEM FOR IMPROVING GROWING CONDITIONS FOR PLANTS AND
FARM ANIMALS IN UNFAVORABLE CLIMATES BY SOLAR ENERGY
Filed April 30, 1952  4 Sheets-Sheet 4
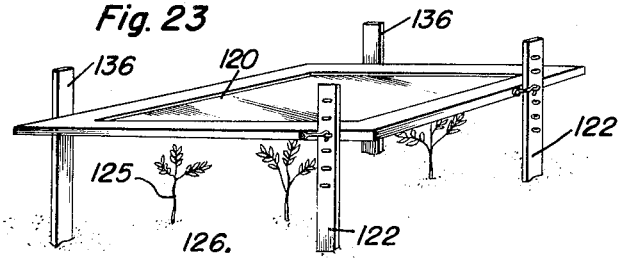
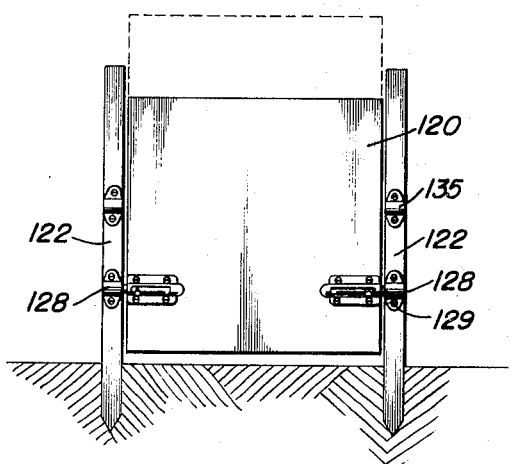
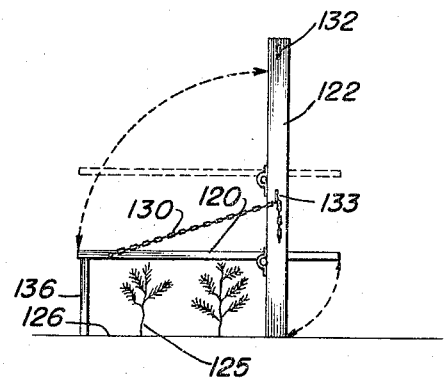
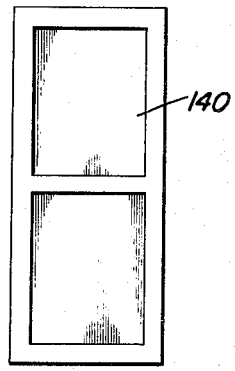
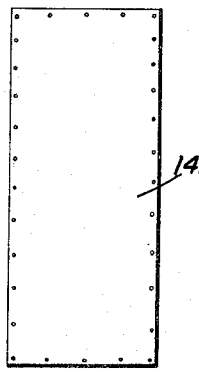
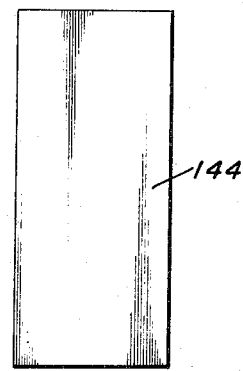
Basil M. Bensin
INVENTOR.
BY *Clarence A. O'Brien*
*and Harvey B. Jacobson*
Attorneys

United States Patent Office 2,777,253
Patented Jan. 15, 1957

2,777,253

SYSTEM FOR IMPROVING GROWING CONDITIONS FOR PLANTS AND FARM ANIMALS IN UNFAVORABLE CLIMATES BY SOLAR ENERGY

Basil M. Bensin, College, Territory of Alaska, assignor of fifty percent to W. G. Atkinson, Tacoma, Wash.

Application April 30, 1952, Serial No. 285,273

3 Claims. (Cl. 47—1)

This invention relates to agricultural improvements, and more particularly to an environmental control for growing plants and farm animals in unfavorable climates by the utilization of solar heat, heat and irradiation available at a certain geographical location and has for its main object to provide a method and means of utilizing the solar heat and radiation which is naturally provided to a higher degree in order to promote the growth, health or well being of forms of life to a larger extent than that corresponding to the share of solar radiation and heat received during normal seasonal conditions in a given geographical location. More particularly the invention has for its main object to provide on a limited area a microclimate in a given geographical location which is more favorable than the climatic conditions corresponding to the region without the application or consumption of energy supplied by external sources.

The production of a microclimate for a limited plant growing area which is more favorable than the natural climate of a locality is most important in connection with the growing of plants producing foods which are essential for life, health or well being at this locality and which, normally, cannot be grown locally but have to be imported from a more favorable region. With many of these plants it is well known that their growing or maturing to the desired stage or phase of development is dependent on the fact that a minimum temperature prevails during a certain number of days and on the further fact that during these days a certain quantity of heat is received at a temperature which is above the minimum. This fact is usually expressed by the product of the temperature in degrees and the number of days during which a temperature exceeding the minimum temperature must prevail in order that the plants may reach maturity or the fruit bearing stage or any other stage in which they are fit for consumption. This product is usually called "degree-days." It is frequently short of the requirement in localities in which otherwise the conditions for growing plants would be favorable. It is, for instance, normally not possible to grow some crops which include many vegetables essential for life either in Alaska or in certain zones of Canada due to the climatic limitations, or to grow warm season crops in northern parts of the United States, because the minimum of "degree-days" is not reached normally, although other climatic conditions, such as rainfall, proportion of dry and humid days etc. may be quite favorable to the cultivation of plants of this type.

Moreover, the gap between the required "degree-days" and the actually available "degree-days" is in many cases not too wide, especially as the lengthening of the day in higher latitudes somewhat compensates for the shortness of the season in which favorable temperatures are prevalent.

Conventionally such gaps are bridged by means of green or warm houses, heated artificially by using external energy such as coal, steam or electricity. This method is however expensive and also excludes outdoor operation.

According to the invention the aforesaid gap between the available "degree-days" and the number of degree-days required for growing a certain plant or vegetable can be bridged to overcome natural climatic limitations, without having recourse to external sources of energy, by the concentration of solar radiation on the area under cultivation and by an improvement of the heat absorption qualities of this area so that a higher temperature will be produced than would normally prevail.

The invention further has the object of providing means for directing the rays impinging on an area larger than the area on which the plants are grown, towards the latter while at the same time means are provided for providing the last named area with a high heat absorption faculty.

A further object of the invention consists in providing means for preventing heat losses by radiation into space. These means may be supplemented or replaecd by physical or chemical heat storage means which can be used without consuming external energy and which may store the heat received during the day giving it off during the night.

A further object of the invention consists in providing reflecting means which are also provided with means for absorbing heat transmitted by the solar rays, so that the said reflectors when placed into the vicinity of the plants or of the soil in which they are grown may not only deflect rays towards the plants or towards the soil in which they are grown, but also are capable of heating the same by heat radiation and by heating the area surrounding the same.

A further object of the invention consists in making said reflectors usable alternatively for day use in which they deflect solar rays towards the plants or the soil in which they grow and for night use in which they reflect back the heat radiation from the soil and the plants towards the same protecting said plants from occasional night frost.

A further object of the invention consists in providing means for storing heat produced by irradiation during the day by physical or chemical processes and giving it off during the night, when it heats air circulating through or around the soil in which the plants grow.

Further and more specific objects will be apparent from the following detailed specification.

The invention is illustrated in the accompanying drawings showing diagrammatically several examples of the method and of the means which have been used. It is however to be understood that the illustration of the method and means is to be considered as made by way of example only in order to better explain the principle of the invention and the different modes of applying said principle. It will be clear that the way of applying the principle and the means used in connection therewith differ with the various conditions and cannot be illustrated in every single case and that therefore a departure from the diagrammatic illustrations is not necessarily a departure from the principle of the invention.

In the drawings:

Figures 1, 2 and 3 are perspective views of reflectors, such as used in connection with this invention.

Figures 4, 5 and 6 are perspective views of boxes or containers for water and chemicals such as Glauber's salts used for storage of absorbed heat during the night, or reflectors provided with heat absorbing surfaces, Figure 5 being a perspective view of such a container provided with a reflector, Figure 6 being a perspective view of a reflector provided with a heat absorbing surface on its outside and heat reflecting surface on the inside.

Figures 7, 8 and 9 are elevational views of reflectors which are simultaneously provided with heat absorbing surface portions.

Figure 10 is a perspective view of a cold frame provided with reflectors.

Figure 11 is a perspective view of a warm bed provided with partly reflecting and partly heat absorbing reflectors.

Figure 12 is a perspective view of a warm bed which is also provided with a heat storage bed.

Figure 13 is an elevational view of an adjustable reflector provided with a heat absorbing surface, the reflector being adjustable vertically.

Figure 14 is a sectional elevational view of the reflector shown in Figure 13 taken along line 14—14 of Figure 13.

Figure 15 is a diagrammatic perspective view of a reflector provided with a heat absorbing surface which is angularly adjustable and which is placed in front of a strip of soil for heating the same.

Figure 16 is an elevational view of a reflector which is angularly adjustable.

Figures 17 and 18 are sectional and elevational views respectively of a reflector which is angularly adjustable using simplified means, the section being taken on line 17—17 of Figure 18.

Figure 19 is a perspective view of a cold frame using an angularly adjustable reflector.

Figure 20 is a diagrammatic elevational view of an arrangement in which plants are grown in a container in front of a vertically adjustable reflector.

Figure 21 is a perspective view of a barn or house provided with a ceiling reflector.

Figure 22 is an elevational view of a barn or house provided with an adjustable ceiling reflector which may be angularly adjusted and may be lowered.

Figure 23 is a diagrammatic perspective view of a reflector which may be used for reflecting solar rays towards plants or the soil in which they grow during the day and which may be lowered to cover the plants and to reflect the radiation of the soil during the night.

Figure 24 is an elevational view of the reflector shown in Figure 23.

Figure 25 is an elevational side view of the reflector illustrated in Figure 23.

Figures 26, 27 and 28 are plan views of reflecting mats for covering seed beds, cold frames or hot beds during the night which reflecting mats may also be used as reflectors.

As has been explained above the invention essentially provides means of concentrating the solar radiation, received on an area which is larger than the area of cultivation, on the said cultivation area and it also provides means for increasing the capacity of this area to absorb heat. Further, according to the invention radiation reflecting means are used for this purpose some of which are also provided with means for absorbing radiated heat so that combined systems are formed consisting of reflector and heat absorbing systems. The reflectors which form part of the above named systems may consist of any reflecting material, but the best and most effective reflectors are made of thin metal sheets, preferably of aluminum sheets, or foils, which either have a smooth flat and polished or a wrinkled surface. A complete and perfect reflection from the reflecting system is not desirable and a certain amount of light dispersion is of advantage in order to avoid concentration of the solar rays on certain spots.

Reflectors according to the invention may either be flat as shown at 10 in Figure 1 or curved as shown at 11 in Figure 2, preferably along a cylindrical surface, or the reflectors may be conical as shown at 12 in Figure 3. The reflectors may also consist of other bodies of rotation produced by rotating a curve around an axis.

In connection with the reflectors heat absorbing structures 14, 15, 16 may be used which are preferably provided with dull black surfaces in order to absorb all heat rays furnished by any radiation which hits the said heat absorbing bodies. The box-like structure 14 may contain a heat developing or heat storing material, either a physical heat storing material which is simply heated during a certain time and gives off the heat received during a following period in which its surroundings are at a lower temperature, such a substance being a liquid, stone, rock fragments, bricks, cement or the like. Alternatively, and especially where the space occupied by the heat storing material is limited, chemical heat storing means can be used such as containers with Glauber's salt

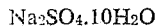

$$Na_2SO_4.10H_2O$$

(decahydrate of sodium sulphate) which melts at low temperatures and re-crystallizes when the temperature drops below the melting temperature, developing heat.

Instead of a chemical heat storing material it may be of advantage to use containers producing heat by means of an organic material within the containers which is undergoing fermentation, acting as a source of heat. While this material, such as leaves, grass, fresh horse manure etc. has to be renewed from time to time, it has the advantage that in addition to producing heat it also produces carbon dioxide during the fermentation process. As the photosynthetic process in the plants is accelerated by the concentration of light and especially by the reflected light thereon, more carbon dioxide is needed to keep up the said photosynthetic process and, as the air does not contain a sufficient amount of carbon dioxide for such an accelerated process the acceleration of the photosynthetic process cannot reach optimal development. If therefore the containers are placed in front of the reflectors these containers not only furnish additional heat but also furnish a sufficient quantity of carbon dioxide to accelerate the photosynthetic process in the plants.

The reflector may have a heat absorbing surface 17 on the outside as shown in Figure 6 or the heat absorbers may be provided with a reflector 18 (Figure 5).

As has been above mentioned the system used according to the invention is mostly a combination system including heat absorbers and heat reflectors. These two units may of course be separate units but preferably combined units are used. The combined units are for instance shown in Figures 7 to 9. These units consist of metal sheets 20, Figure 7, the greater part of which is reflecting but which is provided with a heat absorbing horizontal strip 21 of greater width and with a number of parallel heat absorbing horizontal strips 22 of smaller width. The heat absorbing strips are produced by painting the metal with black paint or by otherwise blackening the surface of the metal strip.

Figure 8 shows another example of such a reflector 24 in which the entire surface is reflecting with the exception of a centrally located horizontal absorbing strip 25. Figure 9 illustrates a reflector 26 which is provided with a number of vertical heat absorbing strips 27 of equal width.

Reflectors of this type when exposed to the rays of the sun will therefore not only reflect the sunlight into a desired direction, but will also absorb heat on part of their surface and will therefore be substantially heated themselves. They then transmit the heat to their surroundings to a much higher degree than the ordinary reflectors, heating the air so as to produce convection currents and also radiating heat to a certain extent into directions other than those corresponding to the angle of incidents of the solar rays.

A system used according to the invention and using combined heat absorbers and reflectors is illustrated in Figure 10 showing a cold frame 30. The cold frame consists of a framework encircling the area 32 on which the plants are grown. This area is preferably of oblong shape with the longer side extending in an east-west direction and the shorter side extending in the north-south direction.

The frame is built in a manner very similar to that of a hot bed frame and it may or may not be covered. On the north side the wall 33 is considerably higher than the wall on the southern side 34 and on the northern wall 33 and on the triangular sides reflector plates 35, 36, are arranged. The reflector plates 35, 36 are only reflecting on the inside; they are blackened and heat absorbing on the outside. The reflector 35 on the north side (which may also be blackened on the outside) is preferably provided with a partly reflecting and partly heat absorbing surface the latter being indicated at 37. However instead of this type of reflector any one of the reflector types shown in Figures 7, 8 or 9 may be used. The reflecting plates may reach down into the soil 38 which is held within the frame.

The soil is covered with coal dust as indicated at 39 or with other black dyed matter to make the soil itself heat absorbing to a higher degree.

The incident sun rays are indicated at 28 and it is seen that they are reflected toward the heat absorbing soil in the area 32.

Obviously, the soil 38 within the area 32 not only receives an insolation which corresponds to that of an area which is much larger than the area which it covers, but as its heat absorbing coefficient is larger than that corresponding to the soil it is also in a position to absorb heat to a larger degree and much quicker, so that it can make good use of the excess heat which is transmitted to it. The temperature of the soil is thus raised much above the temperature it would normally have under the climatic conditions of the surroundings and it is therefore seen that the degree-days during the period during which the temperature is above a minimum, say 50° F., will have a higher value so that warm season plants may be supplied with sufficient heat within a climate in which the soil in its natural state is only provided with a sufficiently large number of degree-days to grow cold season plants, the difference between the degree-days naturally provided to the area and those necessary for growing warm season vegetables being in this case covered by the above mentioned excess radiation received and also by the heat absorption which provides a warming up of the soil to a higher temperature. More specifically the extension of the insolation period in higher latitudes may be made better use of by this arrangement which furnishes the requisite temperature during a larger number of hours than that corresponding to the natural climatic conditions.

The cold frame may either be used uncovered with the plants growing in open air or the cold frame may be covered with a transparent plastic or with a glass sheet of "Cel-o-glass" which is transparent for the ultra-violet rays. For the reflector any suitable construction material for the frame itself may of course be used.

Figure 11 shows the construction of a hot bed generally indicated at 45 and provided with reflectors 43, 40 and further triangular reflectors on the inside of the wall 47. The construction is similar to that of the cold frame shown in Figure 10 but the hot bed construction is always provided with a glass or plastic cover sheet 42. Further the reflectors 43 may be provided with larger and wider heat absorbing strips 44 in order to produce as much heat as possible within the closed space of the hot frame.

Another type of construction in which solar heat is provided by means of a frame having a heat absorption bed in addition to a warm bed is shown in Figure 12. This construction of a warm bed serves mainly the purpose of germination and of starting plants of warm season vegetables. As seen in Figure 12, the frame 50 comprises an upper box structure 51 provided with three reflectors, arranged on the north, east and west sides in the manner described in connection with Figures 10 and 11, said reflectors being indicated at 52, 53, 54. The front wall 55 and the outer walls which are partly shown as broken away are all black in order to absorb heat. The box may be covered with a sheet of plastic or "Cel-o-glass" 56. The bottom of the box 50 is preferably formed by a wire screen 57 covered with gravel on top of which the soil for germinating the plants has been placed. This layer of gravel topped by soil is indicated at 58.

The lower box structure 60 includes a sash frame 61 with a plastic or glass cover 62 arranged in front of the hot bed frame 50. The space within said box 60 which extends behind and below the box structure 50 is filled with black painted or blackened stone or rock fragments 62'. The box structure 60 and the box 50 may of course form a single construction and the lower box 60 may also be provided with reflectors in the manner described in connection with the upper box. All its outer walls are preferably dull black.

The solar rays penetrating through the glass covers 62 heat the stones or rock fragments during the day which heating may be somewhat intensified by the reflectors in the box structure. During the night the stones or rock fragments give off heat and, more specifically, heat the air above them and therefore a convection current will develop which passes on to and through the warm bed and through the layer of gravel and soil 57. In this way the layer 57 is held at a temperature during the night which is much higher than the surrounding temperature, thus keeping the temperature of the warm bed 58 above 50° F. even if the surrounding temperature is somewhat lower.

The above described warm bed structure with the heat storing means may either be used to keep the bed constantly at a temperature which is higher than 50° F. for the above named purpose of germination and of starting plants which are afterwards transplanted to other warm beds or into cold frames, or the construction may be used for producing a larger number of degree-days in which the temperature remains above 50° F. during the growing season. The greater number of degree-days together with the reflector raising the temperature degree values permits to bridge the difference between the number of degree-days required for producing warm season vegetables or hot season vegetables and the number of degree-days above 50° F. actually available at the latitude at which the plants grow.

In Figures 13 to 18 the use of outdoor or garden reflectors 70, 75, 80 for promoting growth or for obtaining an earlier maturity of crops or for increasing the number of degree-days in a given season is shown.

Two different types of outdoor reflectors may be used according to the result which is aimed at. If primarily irradiation of the leaves and stems of plants or the irradiation of the plants themselves is intended the reflector 80 may be of the vertically adjustable type.

The construction permitting such an adjustment for outdoor and garden reflectors is illustrated in Figures 13 and 14. These reflectors are mainly arranged in order to stimulate photosynthesis. By stimulating photosynthesis the maturity of crop plants is speeded up. It will be understood that a number of such reflectors will be used in a garden or on any other grounds on which plants are grown and that they must be properly disposed with respect to the plants. These reflectors also act as shields against winds and they may be disposed accordingly. Manifestly reflectors of this type have to be adjusted to the height of the plants.

Reflectors of this type, indicated at 80, essentially remain in a vertical position. This position however is adjustable with respect to height above the ground the adjustment being performed from time to time in accordance with the height of the plants to be irradiated. Reflectors 80 are therefore held on cables or ropes or wires 81 running over rollers 82 which are mounted on a wall, fence or board 84 or on posts arranged along the reflectors. The walls, posts, fences or boards are preferably held on posts or piles which have been rammed into the ground. The reflector is counterbalanced by a counterweight 83 attached to the wires or ropes or cables 81.

Preferably the reflector 80 is again of the type having a heat absorbing surface 87 or a plurality of these surfaces. The reflector 80 also therefore heats up as it consists of heat conducting material, and it also heats the air in contact therewith. As it is close to the plants which it irradiates it also creates a kind of convection current near and around the plants which receive the increased radiation, which current of relatively warm air contributes to the favorable climate in which the plants grow.

Another type of reflector 70, Figure 15, is adjustable with respect to the angular position relatively to the vertical. This type of reflector intends to increase the heat received by the soil and it is therefore arranged preferably in front of zones or strips 72 of the soil which have been made heat absorbent by spraying on them coal dust or black dye. For maximum efficiency the reflector 70 is preferably easily adjustable. The adjustability is indicated in Figure 15 by a dotted line which marks the vertical position 71 towards which the reflector may be inclined at any desired angle. An incident ray 73 directed toward the soil strip 72 is diagrammatically indicated in the figures in order to show that the solar rays are reflected toward the zone 72 the absorption coefficient of which is increased by the above mentioned coal dust or black pigmented or dyed material 74.

If the reflector is properly adjusted it will be seen that the soil zone 72 receives a multiple of the heat naturally received in the same area, as the insolation corresponds to that received on a much larger area on one hand, and the coefficient of heat absorption of the ground is increased by the material 74.

It will be understood that the reflector adjustment undergoes periodical variations to obtain maximum efficiency of the solar rays absorbed by the soil strip.

A suitable practical construction for this type of reflectors is shown in Figures 16, 17, 18. The outdoor reflector 80 as illustrated in Figure 16, is held by means of wires, cables or ropes 81, moving over pulleys 82 which are mounted on a wall, or fence 84 or on posts in the manner already described in connection with the reflector arrangement shown in Figures 13 and 14. However, the reflector is not completely balanced by counterweights. On the front of the reflector 80 a hinged support 88 may be fixed and the inclination of the reflector 80 therefore is determined by the position of the support which is swung out to such an extent that the reflector is held in the desired angular position with respect to the ground.

A similar but simplified arrangement is shown in Figures 17 and 18. A reflector 75 is held by chains 91 which may be fastened on suitable fastening means arranged in the wall or on the posts or the fence 84. The adjustment is then made by simply adjusting the support 89 and the chains 91 in accordance with the desired position of the reflector.

The application of an adjustable reflector of the type above described in a cold bed is illustrated in Figure 19. The cold bed may be constructed as described in connection with Figure 10, but instead of a fixed reflector in the back wall an adjustable reflector 96 is provided which is held in its position by means of ropes, wires or cables 97 running over pulleys 98 which are mounted on the higher wall of the cold bed. The ropes may be held in any suitable manner by hooks or eyes which hold the ends of the wires or ropes and thereby hold the reflector in its position. The reflector 96 may again be provided with a blackened strip 99 so that it is heated, therefore producing a convection current within the cold bed surrounding the area in which plants are grown.

When it is intended to heat the soil to a higher degree an arrangement such as that shown in Figure 20 may be used.

In this arrangement the plants are grown in tubs, containers or boxes 90 which have been blackened on the outside to make them heat absorbing and these boxes are placed in front of a reflector 80 of the type described in connection with Figures 13 and 14. The tubs are divided and consist of two compartments. The lower compartments of the tubs are filled either with a chemical heat storing means or with stones or rock fragments 92 which store the heat which has been received during the day and which is given off at night. The upper compartment above the stones is separated from the lower compartment by means of wire meshing 94 which supports a layer of gravel and soil in which the plants are grown. The reflector is so adjusted that the heat of the sun is reflected towards the tub and at least two sides of said tub are irradiated during the day, thus providing the heat to be stored by the chemical means, stones or rock fragments 92 which is given off during the night. The reflectors moreover reflect the rays of the sun towards the plants which are grown in the tubs.

For greenhouses a structure quite similar to the cold bed structure shown in Figures 10, 11 and 19, but on a much larger scale, may be used which is provided with a glass covered sash frame covering the front wall having a southern exposure, benches may be arranged along the reflectors on the side walls and in front of the main reflector. Preferably adjustable reflectors such as illustrated in Figure 19 may be used.

The system of increasing radiation by means of reflectors and for preserving heat may also be used in connection with cattle barns, poultry and hog houses and similar structures in which a ceiling reflector 100 may be provided which either covers the entire ceiling of the building, generally indicated at 101, or which is merely arranged on that part of the ceiling which is located in front of the windows 102. The light falling through the window 102 is therefore partly reflected toward the ground and the rear portion of the covered space of the room is thus much better irradiated then it would be without the ceiling reflector 100. The additional light in this case does not only contribute to the well being of the birds or animals which are kept in the barn or house, but it also eliminates parasitic organisms many of which can only grow in spots which are not regularly reached by light.

In addition to the ceiling reflector side wall reflectors may be used.

Instead of a fixed ceiling reflector an adjustable reflector 110 may be mounted on or near the ceiling of a building as illustrated in Figure 22. The reflector 110 is, in this case, suspended on wires, ropes or cables 111 and 116 on the two ends 114 and 115 respectively, which cables, ropes or wires run over the pulleys 112 and 118 mounted on the ceiling, or on the rafters of the roof or on the roof beams. The wires, ropes or cables may be fixed in any desired position by means of hooks or nails provided in the walls or in the ceiling or roof beams or in some other part of the structure.

As will be seen from the figures the two ends 114 and 115 of the reflector 110 may be raised and lowered separately and the reflector may therefore be brought into any desired position and may be used either in an inclined position to reflect the light coming in from the window 102, as indicated in dotted lines in the position 110a or, the reflector may be lowered at night to be as close as possible to the animals or birds held in the house or barn in an essentially horizontal position, indicated in dotted lines at 110b, so as to reflect the body heat developed by the animals or birds towards the ground thus keeping the barn or house warm during the night without having to use special energy consuming heating means.

The principle of reflecting the heat radiated during the night into space towards the soil may also be used in connection with plants and in this case it is of advantage to use reflectors which may be utilized in two ways, namely to irradiate the plants or the soil on which they are grown during the day, by directing the rays of the sun towards them, and to reflect the heat radiated by the soil or developed by the plants during the night back towards the said soil or plants, thus conserving heat to a notable extent.

Such a construction having a double function is illustrated in Figures 23, 24, 25.

The reflector 120 may be held by posts or plies 122 which have been rammed into the ground near the plants 125 to be protected which are grown in a soil which may again be covered with coal dust or other black pigmented or black dyed material 126. The reflector in this case is hinged to the post by means of retractable lock bolts or pins 128 fastened to the reflectors and held in suitable clasps 129 on the posts 122. The reflectors may be held in a vertical position or in any inclined position by means of chains 130 which are fixed to hooks 132, 133.

Preferably a number of hinge clasps 129, 135 are arranged one above the other on the posts 122 in order to mount the reflectors at different heights. The change from one position to another may be easily made by retracting the bolts, thus disengaging the reflectors and by pushing them outwardly again when the desired clasp has been reached.

It is clear that the reflectors may be arranged at any angle or at any height above the ground which may be desirable for one or the other of the two functions which the reflector has to fulfill.

In order to be able to use the reflectors as a means reflecting the heat emanating from the ground, further posts 136 are provided which are either of such height (as shown in Figure 23) that the reflectors may rest upon or may be held by them when brought into a horizontal position in which they are near to and cover the ground in which the plants are grown and act as reflectors for the heat radiated by the ground and the plants during the night. This position is clearly shown in Figures 23 and 25. The reflector when acting as a reflector of ground heat is preferably arranged as closely as possible to the ground. The reflector is brought into this position at night and in this case cuts down substantially on the heat losses suffered by radiation during the night. During the day the reflectors are turned up as indicated by the arrows and serve to irradiate the plants or the soil on which the plants are grown.

To protect against heat losses during the night it is also possible to use special reflecting mats such as illustrated in Figures 26, 27 and 28. They consist of aluminum foils 140 held in a frame or by a back board 142. Either a plurality of foils or a single foil 144 covering the entire board or frame is used. In this way a lightweight ground heat reflector construction is provided which can be easily manipulated and carried around. During the day these frames may be used as reflectors.

From the above description it will be clear that the cooperation between the combination of means for absorbing and conserving heat reecived and for increasing the solar radiation received by each square unit, by concentrating on the area the radiation received on a much larger area, will result in a raising of the mean temperature in which the plants are ground and will moreover accelerate the photosynthetic process performed by the plants. Thus the plants can grow within surroundings which correspond to a much more favorable climate than the one to which they would normally be exposed. Especially when the irradiation means are combined with heat storing means of the chemical or of the physical type it is possible to produce a microclimate for the plants which corresponds to a climate much more favorably situated region than the spot on which the plants are actually grown. This favorable microclimate replaces the local climate and provides the required degree-days for the cultivation of warm season or hot season vegetables notwithstanding the fact that these degree-days are normally not available. The gap is in this case filled without the supply of energy or the consumption of any heat other than the solar energy.

It will be understood that instead of the physical storage means shown boxes with chemical storage means may be used without any further modification. Likewise other unessential changes may be made without departing in any way from the essence of the invention.

Having described the invention, what is claimed as new is:

1. A system of producing on limited areas microclimatic conditions more favorable than climatic conditions prevailing naturally for the growing of plants through an increase of the radiation and heat received by the same which comprises adjustable reflector plates placed near the said plants, for reflecting sunlight impinging upon said plates towards the said plants, said reflector plates being also provided with means for increasing the absorption of solar heat by them, the heat absorbed by the reflector plates producing heat radiation and heating of the air near the said plants by the said reflector plates.

2. A system of producing on limited areas microclimatic conditions more favorable than climatic conditions prevailing naturally for the growing of plants, through the increase of the radiation and heat received by the plants and by the soil in which they grow comprising adjustable reflectors brought into different angular positions relatively to a vertical plane placed near the plants grown in the natural soil, means for increasing the heat absorption of the soil, means for holding the reflectors in an angularly adjustable upright position during the day and with further means for moving them into a substantial horizontal position, in which they are placed above the plants and reflect the heat radiation of the soil toward the same during the night.

3. A system of producing on limited areas microclimatic conditions more favorable than climatic conditions prevailing naturally for the growing of plants through the increase of the radiation and heat received, by the plants and by the soil in which they grow comprising, hinged and pinned adjustable tilting reflectors adapted to be brought into different angular positions relatively to a vertical plane, placed near the plants and provided with means for holding them in an angularly adjustable upright position during the day and with further means for moving them into a substantially horizontal position, in which they are placed above and cover a plant growing strip of soil for reflecting the heat radiation of the soil towards the same during the night and protecting said plants from night frost.

References Cited in the file of this patent

UNITED STATES PATENTS

| | | |
|---|---|---|
| T.M. 191,308 | Westfield | Nov. 4, 1924 |
| T.M. 210,481 | Cello | Mar. 16, 1926 |
| 38,656 | Crozier | May 26, 1863 |
| 94,169 | Jillson | Aug. 24, 1869 |
| 106,298 | Wells | Aug. 9, 1870 |
| 143,213 | Wilson | Sept. 23, 1873 |
| 188,570 | Beidler | March 20, 1877 |
| 189,653 | Pudigon | Apr. 17, 1877 |
| 1,043,594 | Hill | Nov. 5, 1912 |
| 1,864,672 | Rose | June 28, 1932 |
| 1,882,377 | Whittelsey | Oct. 11, 1932 |
| 1,900,193 | Nearing | Mar. 7, 1933 |

FOREIGN PATENTS

| | | |
|---|---|---|
| 339,155 | France | Nov. 7, 1904 |

(Other references on following page)

FOREIGN PATENTS

| | | |
|---|---|---|
| 527,812 | Germany | June 22, 1931 |
| 1,654 | Great Britain | of 1874 |

OTHER REFERENCES

Dull: "Modern Physics," published 1929 by Henry Holt & Co., (N. Y.), pp. 330–331.

Chemical Abstracts, vol. 23, published 1929, p. 2780, article "The use of coal as a fertilizer."

Washington (D. C.) Times-Herald, Sunday, June 9, 1940, p. 4–D, article "Painting the soil black."

Washington (D. C.) Post, Sunday, Aug. 7, 1949, sec. 5, p. 6–R, article "Carbon black hailed as built-in soil heater."

Everson et al.: "Effect of carbon black on properties of soils," Ind. Eng. Chem., vol. 41, No. 8, pp. 1798–1801 (August 1949).